(No Model.)  J. E. CLAYTON.  3 Sheets—Sheet 2.
CONCENTRATOR.

No. 316,116.  Patented Apr. 21, 1885.

Attest:
P. Walter Fowler
P. B. Turpin

Inventor;
Joshua Elliott Clayton (No Model.) 3 Sheets—Sheet 3.
J. E. CLAYTON.
CONCENTRATOR.
No. 316,116. Patented Apr. 21, 1885.
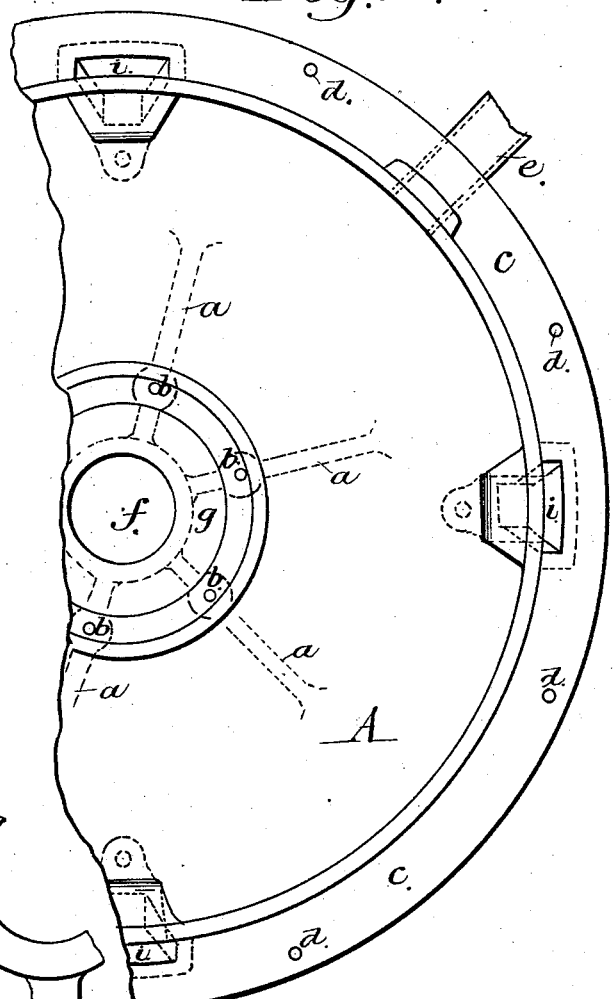
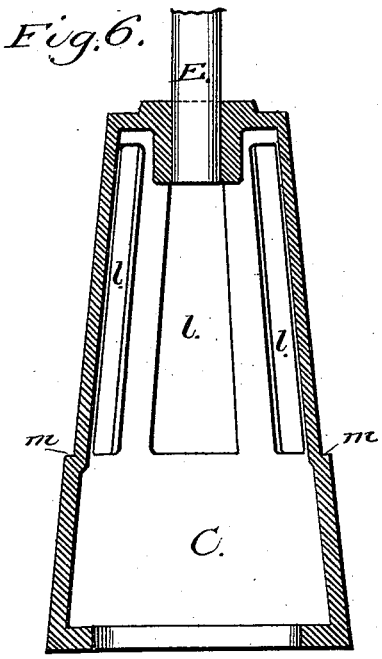
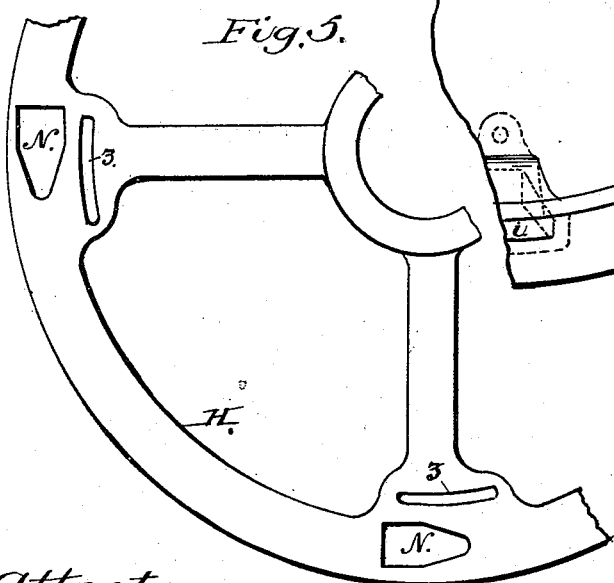
Attest;
T. Walter Fowler
P. B. Turpin.
Inventor;
Joshua Elliott Clayton

UNITED STATES PATENT OFFICE.

JOSHUA ELLIOTT CLAYTON, OF SALT LAKE CITY, UTAH TERRITORY.

CONCENTRATOR.

SPECIFICATION forming part of Letters Patent No. 316,116, dated April 21, 1885.

Application filed December 9, 1884. (No model.)

*To all whom it may concern:*

Be it known that I, JOSHUA ELLIOTT CLAYTON, of Salt Lake City, Utah Territory, have invented an Improvement in Concentrators; and I hereby declare the following to be a full, clear, and exact description of the same.

My invention relates to an improved machine for concentrating slimes, tailings, sulphurets, or other substances in which it is desired to separate the heavier from the lighter portions.

The machine consists of a circular pan having a hollow central cone with vertical slots, through which the discharge of tailings may be made; a series of rings fitting said cone, by which the point of discharge may be raised or lowered; a conoidal diaphragm at the bottom of the pan with outwardly-inclined perforations or jet-holes, through which water may be forced into the mass to be concentrated; a revolving hopper at the top with pipes extending downward, so as to deliver the material to be concentrated around the inner periphery of the conoidal bottom; a series of vertical rods having toes or scrapers at the bottom, arranged with relation to each other so as to act successively in spiral lines upon the lower stratum of concentrates; exterior slotted outlets for the discharge of the concentrated material, and a flat circular wheel or annular disk fitted to the bottom or lower end of the slotted outlets with corresponding holes or openings, and a means for moving it so as to open or close the outlets, together with certain details of construction, all of which will be described, claimed, and more fully explained by reference to the accompanying drawings, in which—

Figure 1:
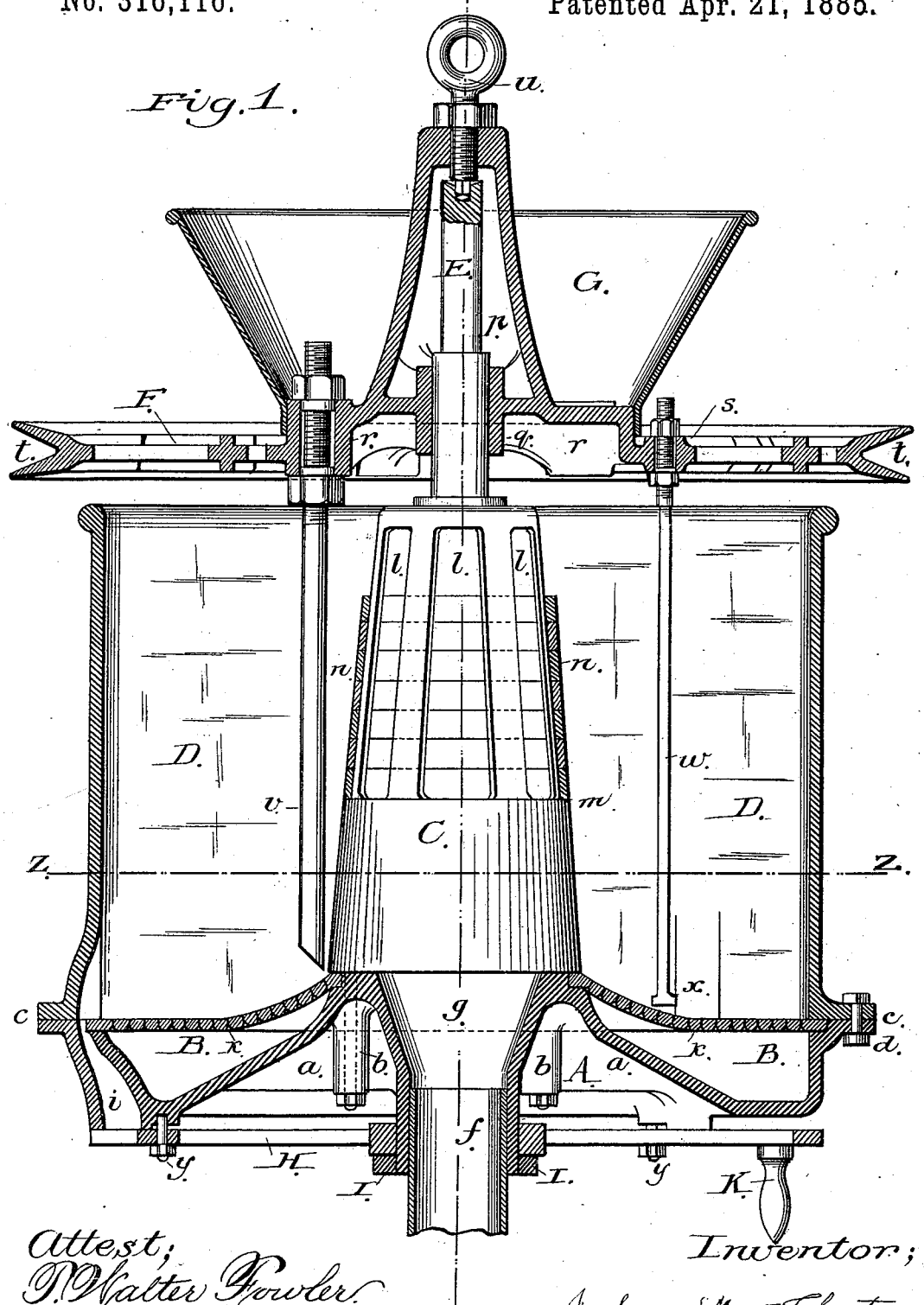
Figure 2:
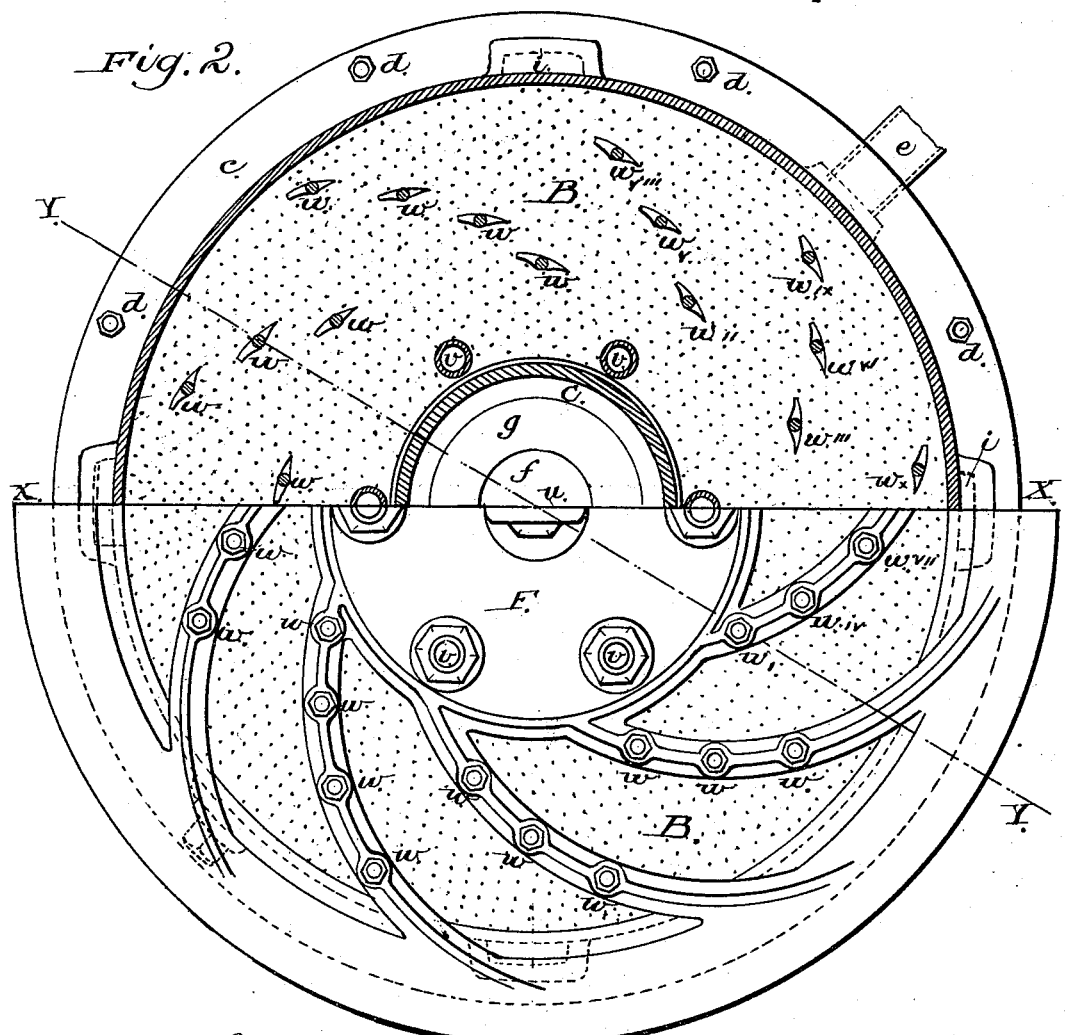
Figure 3:
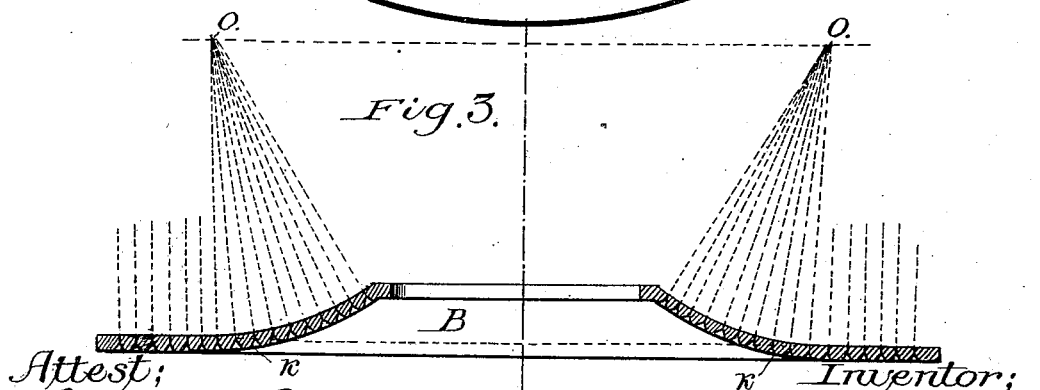

Figure 1 is a vertical section of the machine, the left-hand half of which is taken on line X X, and the right-hand half on line Y Y, of Fig. 2. Fig. 2 is a part plan and part horizontal section, the upper half being a half-section on line Z Z, Fig. 1. Fig. 3 is a vertical section of the false bottom, and showing the arrangement of the jet-holes to discharge outwardly. Fig. 4 is a partial plan of the water reservoir or bottom. Fig. 5 is a partial plan of the disk or wheel for regulating the discharge of concentrates. Fig. 6 is a vertical section of the central cone.

D is a pan, which, in the present case, I have shown in the form of a vertical cylinder having a bottom, A, the two being flanged at their meeting edges, as shown at $c$, so as to be united and secured by bolts $d$. C is a central cone tapering and extending upward toward the top of the pan, and having a spindle, E, secured to the boss upon its top, which projects upward and serves as a journal, around which the cover, F, may turn. A sleeve surrounds the spindle, and the hub or bearing $q$ of the cover turns around this sleeve. A cup or step is formed in the top of shaft or spindle E, and the screw-pin $u$, which passes through the top of the conoid $p$ of the cover, enters this cup, and by turning the pin $u$ up or down through the top of the conoid the cover may be raised or lowered at pleasure. The rim of the cover has a V-shaped groove, $t$, made around its periphery, so that a belt may be applied thereto to rotate it. From the bottom of conoid $p$ this portion of the cover extends outward a short distance in the form of a flat disk having six bosses, $r$. Through these bosses six feed-tubes, $v$, extend downward, terminating near the foot of the cone C, and discharge their contents around the inner edge of the diaphragm B. This central disk, through which the feed-tubes $v$ pass, is slightly raised above the cover F, so that its periphery forms a vertical rim, around which the feed-hopper G fits. From this central portion nine or other number of curved arms extend outwardly, uniting it with the rim of the cover F, and through these arms are made bosses, (in the present case thirty in number,) through which vertical arms or rods $w$ extend downward, and have small scrapers or shoes $x$ fixed to their lower ends, so that when the cover F is revolved the feed-hopper and the tubes $v$ are carried with it, so as to distribute the material upon the inner edge of the diaphragm B, while the arms $w$, with their scrapers, serve to distribute and carry it outward. These arms are arranged practically in spiral lines, and so spaced as to move the concentrated material at the bottom outward in oblique lines from the central cone toward the periphery. The feed-tubes and arms have double nuts by which they may be raised or lowered and secured to the rotary wheel or cover. The arrangement of the plows or scrapers of one set is well shown by the letters $w'$ and $w^x$, Fig. 2, $w'$ being the scraper nearest the center and $w^x$ the one farthest from it. The bottom A is a cylindrical casting having a conoidal shape from the center outward, and it is strengthened from below by ribs $a$, which extend from the central inverted conical discharge, $g$, outward. In each of these ribs enlargements or bosses $b$ are formed, through which pass bolts to secure the central portion to the bottom of the cone C, the outer end being secured to the periphery of the pan D by bolts $d$ through the flanges $c$, as before described. The inverted conical center portion, $g$, of the bottom opens directly into the discharge-pipe $f$.

Upon the exterior of the chamber formed by the bottom A is an opening, with which the water-inlet of the pipe $e$ connects. The conoidal bottom or diaphragm B is annular in form, its inner periphery being fitted to the inner portion of the bottom A and between it and the bottom of the cone C, while the outer periphery extends into a channel between the bottom A and the lower edge of the pan D. This false bottom is made in the form of a frustum of a cone, and it has numerous small holes $k$ drilled through it. These holes are drilled, as shown in Fig. 3, in lines radial to the centers O. They may be from one twenty-fourth to one thirty-second of an inch in diameter upon the upper surface, and may be tapered so as to be larger upon the under surface. This diaphragm has a packing between it and the flanges of the water chamber, so as to make a water-tight joint.

The water which is discharged through the pipe $e$ into the chamber formed beneath the diaphram B is forced upward by the pressure in jets through the small openings $k$, previously described, and the position of these openings causes the jets of water to move obliquely upward and outward toward the periphery of the pan. At the same time the material which is placed in the hopper G is discharged through the tubes $v$ around the inner circle or periphery of the conoidal bottom, being distributed by the rotation of the cover F. The material is thus discharged upon the highest circle or inner rim of the diaphragm B, where it is comparatively free from the concentrated material, and it can be acted on promptly by the inner circle of the oblique jets. The action of these jets of water is to throw the heavy particles of ore outward toward the outlets at the pheriphery of the pan, and at the same time to carry the lighter waste stuff upward and outward above the zone of heavy concentrates. The combined action of the oblique jets and the rotary motion cause the water and waste stuff to rise more rapidly near the periphery than they do near the central cone, C, and I therefore provide suitable gates or openings, $l$, in the upper part of the large hollow central cone, C, for the discharge of these tailings. The discharge-current is a thin surface sheet of water and light particles which are held in suspension. This current starts near the periphery of the pan and moves toward the central openings, $l\ l$. There are six of these vertical rectangular openings extending upward from a shoulder or flange, $m$, which is formed around the cone near their lower ends. A series of rings, $n$, are made to fit the cone surrounding it, as shown in Fig. 1, and by the use of these rings the height at which the discharge takes place may be regulated. Two or more rings being placed upon the cone one above the other will close the openings $l$ to a point as high as may be desired, and the material will then flow over the upper ring. By this movement of the particles from the exterior of the pan toward the center any fine particles of ore that may have been carried by the stronger outward current from the jets will have a chance to settle below the surface of the outflow during its passage inward over the more quiet body of water around the base of the central cone, C. The narrow scrapers or toe-pieces $x$, which are set obliquely to their lines of rotation, and also successively on spiral lines, will act against the lower stratum of concentrates and push them gradually and steadily outward toward the slotted outlets at the periphery. These outlets $i$ may be as many in number as desired. In the present case I have shown four, equidistant from each other.

H is a wheel or disk secured to the bottom of the reservoir A by stud-bolts $y$, which pass through slots $z$ in the wheel H, and also by a central nut or collar, I, so that the wheel may be turned a short distance in either direction. N are holes made through the rim of the wheel H, and corresponding with the outlets $i$. The wheel may have a handle, K; or it may have a lever or hand-screw by which to move it, and by turning it in one direction or the other the openings N may be made to correspond more or less with the openings $i$, and thus discharge the concentrates with greater or less rapidity as they reach the periphery of the false bottom B. The operation of the machine will then be as follows: The disk F is made to revolve slowly on the spindle E. Water at a suitable pressure is let into the chamber between the bottoms A and B. Crushed ore is then fed into the hopper or receiver G, and from this it passes down through the feed-tubes $v$ onto the inner edge of the bottom B. At the same time the water admitted to the water-chamber through the inlet-pipe $e$ passes up through small holes $k$ in the false bottom B, upward through the ore, with a velocity proportioned to the pressure, and finally out through the openings $l$ in the central cone, C, and thence down through the discharge-pipe $f$. This upward current of water sorts the particles of ore according to their density, the lighter particles rising to the surface and flowing out with the water, while the denser particles resting on the bottom are gradually moved outward to the periphery of the pan and the outlets $i$ by the scrapers x by the rotation of the mass, the conoidal or sloping form of the false bottom B, and by the oblique action of the inner circle of jets.

By adding or taking off the rings n, which fit upon the central cone, C, so as to get the proper height of the ore to be acted on, and by suitably regulating the size of the outlets i by means of the wheel H, a perfect separation of the ore or pulp is effected into two parts, depending upon the density of the particles which are fed into the apparatus.

I am aware that concentrating-machines have been made having perforated bottoms, through which jets of water may pass.

I am also aware that vertically-suspended rods have been employed in stirring and agitating the material within the pan. I do not therefore claim these, broadly.

Having thus described my invention, what I claim as new, and desire to secure by Letters Patent, is—

1. The combination of the pan and perforated diaphragm of a hollow central cone extending upwardly from the perforated diaphragm and having vertical slots in it, and a series of rings fitted to the cone for closing more or less of the discharge-openings and raising or lowering the discharge of tailings, substantially as herein described.

2. In a concentrator, the combination of a pan or tub having a chamber at the bottom and an inlet by which water may be admitted under pressure, a diaphragm fitted above said chamber, having holes through which jets of water may be discharged obliquely upward and outward into the pan, means for discharging the pulp or material to be worked around the central cone and above the perforated diaphragm, and a series of narrow slots or openings at the periphery of the diaphragm, through which the heavier concentrates may be continually discharged, substantially as herein described.

3. In a concentrator, a pan or tub having a central cone with adjustable discharge-openings near the top, a chamber at the bottom, into which water under pressure may be admitted, an inclined or conoidal diaphragm above said chamber, having jet-holes through which water may be thrown upward and outward into the mass within the pan, and a series of discharge-slots around the periphery of the diaphragm, in combination with the cover of the pan-scrapers or toe-pieces, and arms or rods set obliquely to the line of rotation and arranged to act successively in spiral lines upon the lower stratum of concentrates, substantially as herein described.

4. In a concentrator, a pan or tub having a central cone provided with discharge-openings, a hopper and tubes by which the material is deposited, a perforated diaphragm around the base of the cone, said diaphragm having holes through which jets of water are discharged upward and outward toward the periphery of the pan, and a series of discharge openings or slots at the periphery of the diaphragm, in combination with a flat annular disk having holes corresponding with the discharge-outlets, and means for adjusting said disk to open or close the discharge-outlets, substantially as herein described.

5. In a concentrator, a pan or tub having a central cone, a water-chamber beneath, and a perforated diaphragm through which jets of water are thrown obliquely outward and upward within the pan, in combination with a circular rotating feed-hopper having a series of outlet-tubes or feed-pipes extending through the bottom and down around the central cone to discharge the material at or near the inner circle of oblique jets, whereby the material is distributed upon the highest point of the diaphragm and acted upon successively by the jets as it passes toward the periphery of the pan, substantially as herein described.

6. A concentrator consisting of a containing pan or tank having a water-chamber beneath, a diaphragm with perforations formed to give the water an oblique upward direction, a series of narrow scrapers set obliquely to their lines of rotation in the bottom zone of concentrations to assist in moving them steadily outward, the outlets, a hollow central cone provided with openings for the discharge of tailings, a series of rings fitted loosely around the cone to regulate the height of the discharge, and an annular rotating feed-hopper provided with outlet feed-tubes to distribute the material upon the diaphragm around the base of the cone, substantially as herein described.

In witness whereof I have hereunto set my hand.

JOSHUA ELLIOTT CLAYTON.

Witnesses:
 JNO. Q. PACKARD,
 SIMON F. MACKIE.